United States Patent
Sugiyama et al.

(10) Patent No.: US 8,782,150 B2
(45) Date of Patent: Jul. 15, 2014

(54) METHOD AND APPARATUS FOR ENABLING DEVICE COMMUNICATION AND CONTROL USING XMPP

(75) Inventors: Nobukazu Sugiyama, San Diego, CA (US); Srivastava Nanduri, San Diego, CA (US); Andy Nguyen, San Diego, CA (US); Kai Liu, San Diego, CA (US); Lobrenzo Wingo, San Diego, CA (US); Jeffrey Tang, San Diego, CA (US); Aran Sadja, San Diego, CA (US); Ludovic Douillet, Escondido, CA (US); William Collins, San Diego, CA (US)

(73) Assignee: Sony Corporation, Tokyo (JP)

( * ) Notice: Subject to any disclaimer, the term of this patent is extended or adjusted under 35 U.S.C. 154(b) by 225 days.

(21) Appl. No.: 13/109,969

(22) Filed: May 17, 2011

(65) Prior Publication Data

US 2012/0117168 A1 May 10, 2012

Related U.S. Application Data

(60) Provisional application No. 61/411,590, filed on Nov. 9, 2010.

(51) Int. Cl.
*G06F 15/16* (2006.01)

(52) U.S. Cl.
USPC ........... 709/206; 709/204; 709/205; 709/217; 709/218; 709/219

(58) Field of Classification Search
USPC .................. 709/201–207, 217–219, 230–232
See application file for complete search history.

(56) References Cited

U.S. PATENT DOCUMENTS

| | | | |
|---|---|---|---|
| 6,349,352 B1 | 2/2002 | Lea | |
| 6,466,971 B1 | 10/2002 | Humpleman et al. | |
| 6,546,419 B1 | 4/2003 | Humpleman et al. | |
| 6,801,507 B1 | 10/2004 | Humpleman et al. | |
| 7,200,683 B1 | 4/2007 | Wang et al. | |
| 7,707,249 B2 | 4/2010 | Spataro et al. | |
| 7,720,981 B2 | 5/2010 | Nomura et al. | |
| 8,104,044 B1* | 1/2012 | Scofield et al. | 719/313 |
| 2003/0002849 A1* | 1/2003 | Lord | 386/46 |
| 2003/0156827 A1* | 8/2003 | Janevski | 386/96 |
| 2005/0168630 A1* | 8/2005 | Yamada et al. | 348/383 |
| 2006/0123124 A1 | 6/2006 | Weisman et al. | |
| 2006/0230183 A1 | 10/2006 | Zhu et al. | |
| 2007/0143801 A1* | 6/2007 | Madonna et al. | 725/80 |
| 2007/0276864 A1 | 11/2007 | Espelian | |
| 2008/0046944 A1* | 2/2008 | Lee et al. | 725/110 |
| 2009/0228566 A1 | 9/2009 | Sharp et al. | |
| 2009/0300109 A1* | 12/2009 | Porter | 709/203 |
| 2010/0071053 A1* | 3/2010 | Ansari et al. | 726/12 |

(Continued)

*Primary Examiner* — Awet Haile
*Assistant Examiner* — Eric Myers
(74) *Attorney, Agent, or Firm* — Fitch, Even, Tabin & Flannery LLP

(57) ABSTRACT

A method and device is provided for platform independent device communication by detecting a request at a processor-based device to perform a function, determining an external device corresponding to the request, retrieving a tag for the external device for performing a function corresponding to the request and generating a message implemented in XMPP, having embedded therein the tag, wherein the tag is essential at the external device for performing the function corresponding to the request. Receiving the message at a device, determining whether the message comprises a device message, retrieving a tag included in the message, wherein the tag corresponds to an executable command to perform a function and executing the tag to perform the function.

25 Claims, 10 Drawing Sheets

(56) References Cited

U.S. PATENT DOCUMENTS

| | | |
|---|---|---|
| 2010/0241748 A1 | 9/2010 | Ansari et al. |
| 2010/0306373 A1* | 12/2010 | Wormley ............... 709/224 |
| 2011/0137976 A1* | 6/2011 | Poniatowski et al. ......... 709/203 |
| 2011/0275548 A1* | 11/2011 | Handl et al. .................. 508/125 |

* cited by examiner

METHOD AND APPARATUS FOR ENABLING DEVICE COMMUNICATION AND CONTROL USING XMPP

This application claims the benefit of U.S. Provisional Application No. 61/411,590, filed Nov. 9, 2010, entitled "PRACTICAL APPLICATIONS OF XMPP IN SONY DEVICES," which is incorporated in its entirety herein by reference.

BACKGROUND OF THE INVENTION

XMPP (Extensible Messaging and Presence Protocol) is an open-standard communications protocol for message-oriented middleware based on Extensible Markup Language (XML) software clients. XMPP is a presence and messaging protocol that allows devices to persistently connect to a central server. XMPP is used in some instances as an open protocol made for Instant Messaging to enable users to communicate with other friends instantly with persistent connection.

SUMMARY OF THE INVENTION

In one embodiment, the invention can be characterized as a method comprising detecting a request at a processor-based device to perform a function, determining an external device corresponding to the request, retrieving a tag for the external device for performing a function corresponding to the request and generating a message implemented in XMPP, having embedded therein the tag, wherein the tag is essential at the external device for performing the function corresponding to the request.

In another embodiment, the invention can be characterized as a device comprising a processor configured to perform the steps comprising detecting a request at a processor-based device to perform a function, determining an external device corresponding to the request, retrieving a tag for the external device for performing a function corresponding to the request and generating a message implemented in XMPP, having embedded therein the tag, wherein the tag is essential at the external device for performing the function corresponding to the request.

In a further embodiment, the invention may be characterized as a tangible non-transitory computer readable medium storing one or more computer readable programs adapted to cause a processor based system to execute steps comprising detecting a request at a processor-based device to perform a function, determining an external device corresponding to the request, retrieving a tag for the external device for performing a function corresponding to the request and generating a message implemented in XMPP, having embedded therein the tag, wherein the tag is essential at the external device for performing the function corresponding to the request.

In yet another embodiment, the invention may be characterized as a method comprising receiving a message implemented in XMPP, determining whether the message comprises a device message, retrieving a tag included in the message, wherein the tag corresponds to an executable command to perform a function when it is determined that the message comprises a device message and executing the tag to perform the function.

In still a further embodiment, the invention may be characterized as a device comprising a processor configured to perform the steps comprising receiving a message implemented in XMPP, determining whether the message comprises a device message, retrieving a tag included in the message, wherein the tag corresponds to an executable command to perform a function when it is determined that the message comprises a device message and executing the tag to perform the function.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
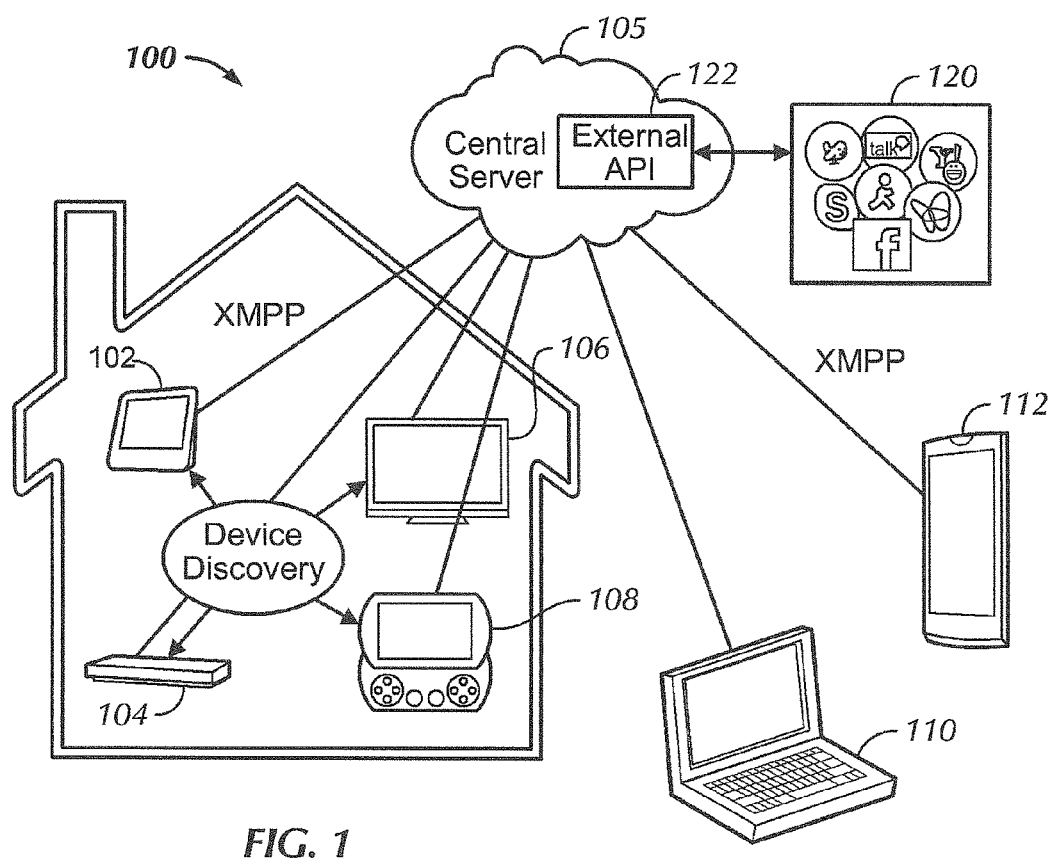
FIG. 1 is an exemplary embodiment of an environment within which the methods and apparatuses of the present application are implemented, according to several embodiments of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

XMPP (Extensible Messaging and Presence Protocol) is an open-standard communications protocol for message-oriented middleware based on Extensible Markup Language (XML) software clients. XMPP is a presence and messaging protocol that allows devices to persistently connect to a central server. This persistent connection allows for innovative new applications by resolving home firewall challenges and providing a means of connecting users and devices. XMPP is used in some instances as an open protocol made for Instant Messaging to enable users to communicate with other friends instantly with persistent connection.

The present invention employs the XMPP protocol in several exemplary applications including remote device control, server push of data and messages, instant messaging between users (including multimedia transfer), and device activity notification (a.k.a. presence), controlling devices within the network, and/or to send system and/or device specific messages to the one or more devices connected to the network.

Referring first to FIG. 1, an exemplary embodiment of an environment within which the methods and apparatuses of the present application are implemented is illustrated according to several embodiments of the present invention. As shown, in one embodiment, the device network 100 comprises one or more local devices 102, 104, 106 and 108 within a home as well as one or more remote devices 110 and 112 as well as external devices/applications 120 in communication with one another. For example, the one or more local, remote and/or external application/devices (collectively referred throughout as devices) may comprise entertainment devices, game consoles, home appliances, mobile phones, handheld devices, tablets, personal computers, etc. In one embodiment, each device within the network is in communication with a central server 105, e.g., SONY Server. In one or more embodiments, each device may comprise means for establishing a connection and receiving one or more messages, either through a wired and/or wireless communication. In another embodiment, one or more devices may be connected to another device by means such as an HDMI or VGA cord, electrical connection, power network, etc., and may send and receive messages through the other device(s). In one embodiment, the central server 105 is directly in communication with each of the local devices 102, 104, 106 and 108 within the home network, as well as remote devices 110 and 112 and external devices/applications 120.

In one embodiment, central server 105 manages all communication to and from the local devices, remote devices and external devices/applications. In another embodiment, one or more local devices and/or remote devices may further have a separate direct communication channel with one or more other local and/or remote devices in addition to or instead of the communication established through the central server 105. In one embodiment, the central server 105 comprises an external API 122 for communicating with the external devices/applications 120. In one embodiment, the central server 105 may serve as a central server for all the local devices, remote devices and external applications/devices, and all devices and central server 105 comprise a device network 100.

In one embodiment, local devices 102, 104, 106 and 108 have the capability to discover one another. In one embodiment, device discovery may be performed through the central server 105, while in another embodiment the device discovery is performed separately at each local device with respect to the other local devices.

Once this communication is established between the central server 105, one or more local devices 102, 104, 106, 108, remote devices 110 and 112, and/or the external devices/applications 120, the system is then capable of performing one or more functionalities including, chatting, voice messaging, presence inquiries and updates, content sharing and synchronization, device control and system messages. In one or more embodiments, the system uses the XMPP protocol for sending and receiving communications between the one or more devices within the network.

The present invention employs the XMPP protocol in several exemplary applications including remote device control, server push of data and messages, instant messaging between users (including multimedia transfer), and device activity notification (a.k.a. presence).

In one embodiment, the instant messaging features provides for pre-selected canned text and audio messages in addition to software keyboards, providing an easy way for user to send a message. In one or more local devices and/or remote devices having voice functionality, including for example the SONY DASH, the voice message feature employs integrated or external microphones and speakers to provide voice message capabilities. For example, in one embodiment, PCM data captured from a microphone is encoded into an optimal format, e.g., MP3 for size reduction, and uploaded to the central server 105, and a URL of the voice message in compressed format is sent to the client, i.e., the local or remote device initiating the message. The client then sends the URL to another client, i.e., a second local or remote device, so that the other client can access and play the MP3 file from the server.

In one embodiment, the system further enables presence updates. One or more local devices 102, 104, 106, 108, remote devices 110, 112, and/or external devices/applications 120 may be connected to the central server 105, including for example a television, computer, tablet, and other consumer electronic devices and equipment. In some embodiments, the system is able to update "user presence", which refers to the current action being taken by the user operating one of the local devices, remote devices or external devices/applications. In one embodiment, the presence message comprises the current status of the device including one or more of a current content being played at the device, current location of content being played at the device, operational status of the device, and a user operating the device.

For example, the local device 102, shown as the SONY DASH, can play internet movie and internet radio, and it can automatically update user presence of the content it plays. For example, if the local device 102 plays Thriller from Michael Jackson, the device presence can automatically be changed to "Watching Thriller from Michael Jackson channel", so that user at the local devices 104, 106, 108, remote, devices 110, 112 and/or at external device/applications 120 can see the status, i.e., content playing at the local device 102. In another embodiment, the device may be communicationally coupled to other devices through the device network. In another embodiment the local devices 102, 104, 106, 108 may comprise devices within a home network, and may communicate with one another directly through LAN, WAN or other network connection means. According to several embodiments, the local devices, remote devices, and/or external devices/applications (referred to throughout generally as devices) may receive presence updates from other devices, which are displayed to the users at each of the one or more devices.

In one embodiment, the central server 105 may serve as a central server for all the local devices, remote devices and external applications/devices, and all devices and central server 105 comprise a device network. In one embodiment, each of the local and/or remote devices may automatically, upon establishing connection with the central server 105, and thus with all devices within the device network, forward a presence message to one or more other devices within the device network through the central server 105. In one embodiment, the presence message is implemented in XMPP and includes information such as one or more of a current content being played at the device, current location of content being played at the device, operational status of the device, and user operating the device.

In one or more embodiments, in addition to viewing user presence of one or more devices, the current system allows users at various devices within the device network, to view the presence for other devices and choose to participate/share in the action being performed by the user at one of the other devices. For example, in one embodiment, a user at a first device, may receive a presence update of the second device and may request to join the user at the second device.

In such embodiment, the central server 105 may for example generate a package having the content and/or an address or pointer to the content, e.g., URL to the content. In one embodiment, the central server 105 may query the second device for content and generate a URL. The central server 105 or the second device may then forward the content to the first device. In one embodiment, the central server 105, or the second device, may further provide the first device with a synchronization tag providing synchronization information regarding the current location within the content being played at the second device. In such embodiments, the user at the first device is able to access the content using the URL or data package and may further employ the synchronization tag to start playing the content at the same location as it is being viewed at the second device. In one embodiment, once the users choose to start a shared viewing session, the instant messaging operation may be initiated to allow the users to discuss the content or their viewing experience while having a synchronized viewing experience.

In another embodiment, the present system provides one or more of the devices means for controlling other devices within the device network, i.e., through central server 105. In one embodiment, for example, one or more tags may be defined for device control, and embedded within an XMPP message, e.g., in the text. In such embodiments, upon receiving the tag at the device, the device is able to perform the function corresponding to the tag. In such embodiments, as the tag is embedded within the XMPP message, any modifications as to platform or protocol at one or more devices are only required on the server side at central server 105. In this manner, functions such as volume change and reboot may be implemented.

Additionally, the system is capable of employing the persistent nature of XMPP connection and communication to send system and/or device specific messages to the one or more devices connected to the central server 105. In one embodiment, for example, messages containing software updates or advertisement may be sent to one or more devices within the device network. In one embodiment, one or more system messages may be sent to a specific one or more of the devices, while in another embodiment, a broadcast message may be sent to all devices within the device network.

In one embodiment, the one or more functionalities are performed by executing a server side application at the central server 105 as well as client side applications at each of the devices. That is in one embodiment, the central server 105 acts as the central hub and all local devices 102, 104, 106, 108, remote devices 110, 112, and external devices/applications 120 are clients of the central server 105.

In one embodiment, the one or more functions described above may be established by sending communication from each local device 102, 104, 106, 108, remote device 110, 112 or external device/application 120 to the central server 105, which then processes and forwards the message to the appropriate device/application.

Figure 9:
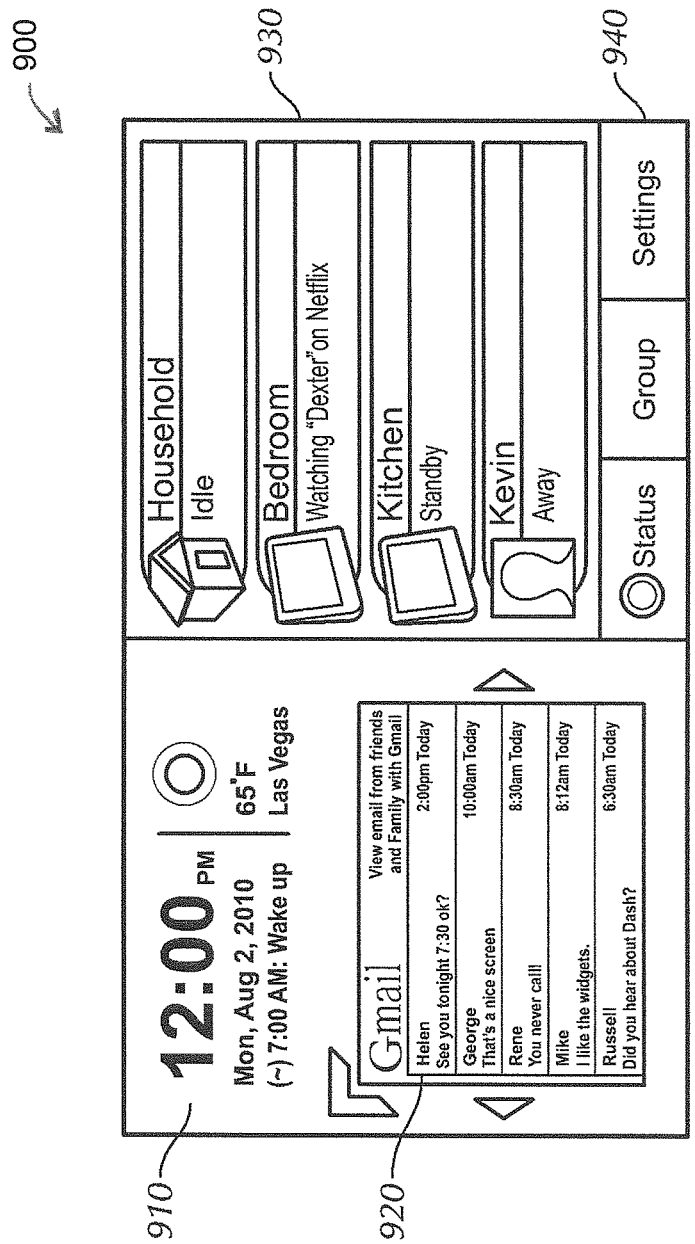
FIG. 9 is an exemplary embodiment of a screen display at a device for displaying one or more user interfaces and/or content, according to several embodiments of the present invention.

Referring to FIG. 9, an exemplary embodiment of device display 900 is illustrated for displaying one or more of the functionalities of the present system. In one embodiment, for example, the display 900 comprises a display at one or more of the local devices 102, 104, 106, 108, remote devices 110, 112 and/or external devices/applications 120.

As shown, the display 900 provides one or more information display areas for displaying information available as a result of one or more of the functionalities performed by the system. A first display area 910 is provided for displaying general information such as time, date, weather, and/or location information. Such information may be sent to the device having the display 900, i.e., one of the local devices 102, 104, 106, 108, remote devices 110, 112 and/or external devices/applications 120, through the central server 105.

In one embodiment, the central server may comprise Internet connectivity and may be configured to connect to one or more web applications and obtain such information which is then sent to the device through the connection. In one embodiment, such information may be embedded in an XMPP message and forwarded to the device to be displayed on display 900. In one embodiment, the information is sent in a format that can be displayed by the specific device.

In addition, display area 910 may further display alarm information, and other user specific settings. In one embodiment, such information may be set at the local device and performed without any communication with other devices and/or the central server 105. In another embodiment, the data may be sent to the server for storage and may be forwarded to the device to be displayed in a similar manner as described above with respect to the general information.

A second display area 920 displays a chat window comprising one or more connections of the user operating the device. In one embodiment, the chat window may comprise connections within the device network 100 as well as connections that are not part of the device network. In one embodiment, the chat window may present a chat client providing a combination of one or more existing external chat clients as well as the local chat capabilities of the present system. For example, in one embodiment, the user may communicate with the central server 105 and request that a chat client be provided. In such embodiments, the central server may query one or more external devices/applications 120 providing chat capabilities, e.g., GOOGLE TALK, MSN MESSENGER, AOL MESSENGER, etc, through the external API module 122. In one embodiment, the connection information associated with the user is received at the central server 105 and processed and communicated to the device to be displayed on display area 920 of the display 900. In one embodiment, the connections may be combined at the central server 105 such that the chat client appears as a singular chat client to the user of the device.

In one embodiment, to query these chat clients, the user may need to provide login information for each external chat application. In one embodiment, such login information may be provided by the user at the time of the query, and/or be stored at the central server 105 in association with a user and/or device profile.

As mentioned above, the present system additionally or alternatively provides chat functionality for direct communication between the devices within the device network 100. In one embodiment, the instant messaging features provides for pre-selected canned text and audio message in addition to software keyboards, providing an easy way for user to send a message. In one or more devices having voice functionality, including for example the SONY DASH, the voice message feature employs integrated or external microphone and speakers to provide voice message capabilities. For example, in one embodiment, PCM data captured from a microphone at a first device is encoded into an optimal format, e.g., MP3 for size reduction, and uploaded to the central server 105, and a URL of the voice message in compressed format is sent to the first device. The first device then sends the URL to a second device, so that the second device can access and play the MP3 file from the central server 105.

In such embodiments, the chat window display area 920 may further include the devices or users associated with the devices within the device network 100, wherein the user is able to communicate with each user within the chat window. In one embodiment, the user is capable of communicating with all users within the chat window seamlessly, without having to differentiate between local or external chat connections. In such embodiments, the central server 105 will receive communication messages and will forward them to the appropriate external applications or local or remote devices within the device network. In yet another embodiment, the device may be able to directly communicate with local users/devices within the device network 100 to send one or more XMPP messages without having to go through the central server. In yet a further embodiment, the client may establish communication with external services and may receive information through the separate dedicated connection, in addition to or in lieu of the connection through the central server.

A third display area 930 may display information regarding the devices and users within the device network 100. In one embodiment, information regarding the overall device network, the one or more local devices 102, 104, 106, 108, or all devices within the device network, devices within a specific area as well as individual information regarding one or more local devices 102, 104, 106, 108, remote devices 110, 112 and/or external application/devices 120, and individual users associated with these devices may be displayed to the user through display 900.

In one embodiment, as shown in the exemplary display 900 of FIG. 9, status information regarding the "household", "Bedroom", "Kitchen", and user "Kevin" may be displayed. In one embodiment, the one or more devices within the device network each register with the central server and include a profile including information regarding the device, settings, menu information, associated users, areas within device network or home, etc. In some embodiments, user profile information regarding one or more users associated with one or more devices within device network 100 may further be stored. In one embodiment, this information may be stored locally within the device and/or within the central server. As describe above, in one embodiment, one or more devices within the device network may be configured to discover other devices within the device network 100, or within a specific area, e.g., local devices 102, 104, 106, 108 which are within the home, and may establish communication with those devices and their associated users.

As described above, in one embodiment, the system is configured to collect and provide the device with presence updates regarding the one or more local devices 102, 104, 106, 108, remote devices 110, 112 and/or external devices/applications 120 in communication with the device either directly or through the central server 105, including for example a television, computer, tablet, and other consumer electronic devices and equipment. In such embodiments, the device can query the discovered devices and applications and receive and/or update "user presence" regarding the devices, which refers to the current action being taken by the user and or performed on the device(s). For example, the SONY DASH device 102 can play internet movie and internet radio, and it can automatically update user presence using the content it plays. For example, if the user device plays Thriller from Michael Jackson, the device presence can automatically be changed to "Watching Thriller from Michael Jackson channel", so that friends can see it. In one embodiment, a device may only update its own presence which is then displayed to the users at one or more other devices within the device network. In another embodiment, the device may be connected to other devices within a device network, e.g., home network, and may receive presence updates from these devices, which are displayed to the users operating the device within the area 930.

For example, FIG. 9 shows four displayed presence information. In this embodiment, the presence information refers to the overall Household, Bedroom, Kitchen and to a specific user of interest. As shown, the user viewing display 900 is able to view the status of each area device and/or user of interest. In one embodiment, the presence data displayed within display area 930 is displayed by the system based on a user profile. In another embodiment, the user is able to enter groups for which the user seeks device or system setting status information and will be able to view status updates for all devices/users of interest to the device user. For example, in one embodiment the display may provide a menu area 940 to allow the user to set certain preferences. In one embodiment, the menu may allow the user to select information the user wishes to view, groups the user wishes to be connected to, overall system settings, etc. In one embodiment, the user is further able to set a personal status which may be viewable by other devices within the device network. In one embodiment, such information may be stored within the user profile stored locally at the device and/or remotely within the central server 105 and may be retrieved to create the display area 930.

As described above, the display area 930, and/or a separate display area within the display 900 may provide information regarding the content being viewed at the devices within the network, either as part of or separate from the status information. In one or more embodiments, in addition to viewing user presence the user may be able to choose to participate/share in the action being performed by the user at the one or more devices within the device network 100. For example, in one embodiment, a user at a first device, may receive a presence update of the second device and may request to join the user at the second device in the activity indicated in the status update, e.g., media being viewed at the second device.

In such embodiment, the central server may receive the request from the user wanting to join the other device, and query the second device for the content. In another embodiment, such content may be stored at the central server and no query may be required. In addition, the central server will retrieve current playing information from the user and or from the storage. Next, in one embodiment, the central server may generate a package having the content and/or an address, link or pointer to the content, e.g., URL to the content using for example the XMPP message protocol. In one embodiment, the system may further provide the first device with a synchronization tag or time stamp providing synchronization information regarding the current location within the content being played at the second device. In one embodiment, the tag is further attached or integrated with the XMPP message. In such embodiments, the user at the first device is able to access the content using the URL or data package and may further employ the synchronization tag to start playing the content at the same location as it is being viewed at the second device. In one embodiment, once the users choose to start a shared viewing session, the instant messaging function may be initiated to allow the users to discuss the content or their viewing experience while having a synchronized viewing experience.

In one embodiment, instead of going through the central server 105, the users at devices within the network device may directly communicate via XMPP messaging similar to the method described above with respect to the central server, and the central server may not be needed in performing the steps described above. As the XMPP communication allows for persistent communication in order to allow for ongoing synchronized viewing experience the first device may periodically query the central server and/or other device to receive update synchronization tags. In one embodiment, such updated tags are sent as text or attachments embedded within an XMPP message.

In another embodiment, the present system is capable of controlling devices connected via the device network 100. In one embodiment, for example, one or more tags may be defined for device control, and embedded within an XMPP message, e.g., in the text. In such embodiments, upon receiving the tag at the device, the device is able to perform the function corresponding to the tag. In such embodiments, as the tag is embedded within the XMPP message, any modifications as to platform or protocol at one or more devices are only required on the server side. In this manner, functions such as volume change, reboot, play, pause, rewind, power on/off, or any other function performable at any of the devices within the network may be performed.

For example, in one embodiment, the user may be able to discover and view one or more devices as described above. In such embodiment, the identifier information regarding one or more devices may be sent to the user device, for example through XMPP messages. The client device may then generate and display a display of all connected devices within the device network 100 at the display 900. In one embodiment, one or more of such devices may allow for remote control. In such embodiments, the functions which may be controlled remotely can further be sent to the device to be displayed on display 900. In such embodiments, the user may select a function and request that the function be performed at the selected device. In such embodiments, the request is sent to the central server 105. Central server 105 includes the functionality to receive the request from the first device comprising the request and to generate a message to the second device comprising the command tag to perform the function.

Figure 2:
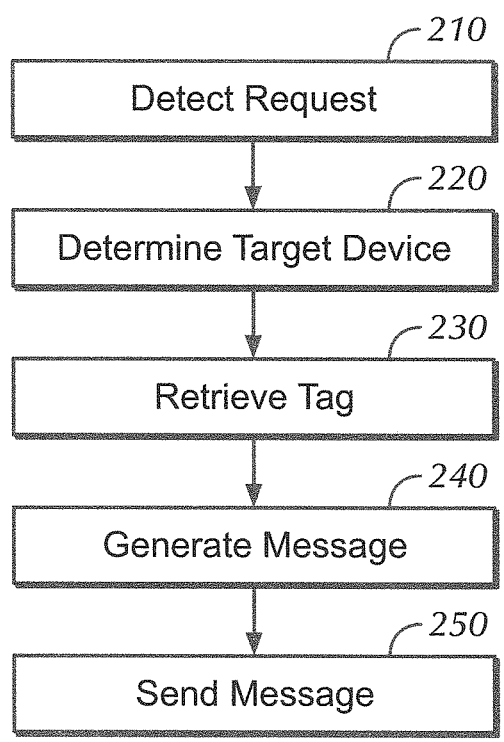
FIG. 2 is a flow diagram of an exemplary method performed at the central server for providing communication between one or more devices within the network, according to several embodiments of the present invention.

FIG. 2 illustrates a flow diagram of an exemplary method performed at the central server for providing communication between one or more devices within the device network.

First, in step 210, a request from a first device is received at the central server 105. For example, as described above, a user at the first device will view one or more devices and will select one of the devices. The user may then request to send a communication, content or command to the selected device. In one embodiment, the first device will generate a message to the central server to communicate the request to the central server 105. For example, in one embodiment, an XMPP message containing the request is sent to the central server 105.

Upon receiving the request from the first device, the process continues to step 220, where the central server 105 determines the target device corresponding to the request. For example, where the user requests to send a message to another device, send a remote content request to another device, send content to a user at the other device for synchronization and sharing, or send a control command to the other device for causing a function to be performed at the device, in step 220, the process determines the device that the message, request, content or command needs to be sent to.

Next, in step 230, a tag for performing the function corresponding to the request is retrieved according to the determination made in step 220. For example, in one embodiment, the tag includes a URL to the content request, a message text package prepared for the determined device of step 220, a specific command tag for the determined device, etc. In one or more embodiments, the tag is essential at the determined target device for performing the function corresponding to the request. For example, in one embodiment, the first device sending the message, request, content or command, has no knowledge of the specific platform, protocol and/or implementation details of the target device.

That is, in several embodiments, the only information sent to the first device regarding the target device is information such as the identification information regarding the target device, users at the target device, functions that are performable at the target device, etc. In one or more embodiments, to provide for easy and seamless functionality of the devices within the device network 100, the devices are not aware of the specific players, platform, protocols and functional specifications of other devices that they may communicate with. Therefore, in such embodiments, the central server 105 is configured to perform the functionalities necessary to provide the target device with information that is customized to the implementation specifications of the target device.

For example, in one embodiment, the central server 105 may have access to a table, stored either locally at the central server 105 or at a remote database coupled to the central server 105, to determine the specific target device function commands to perform the specific functions, and such information is included in the tag to enable the target device to be able to perform the functions. In another embodiment, the tag may comprise synchronization information that the target device requires to play the content sent from the first device in such a way that the first device and target device can share in the viewing experience. In such embodiments, the central server 105 is configured to receive playback data from the first device and create a synchronization tag such that the synchronization data is easily received at the target device and used to playback the data synchronously with the first device.

Next, in step 240, a message is generated at the central server 105, having embedded therein the tag. In one embodiment, the message may be implemented in XMPP. As described above, the XMPP message may be generated, with the tag provided as an attachment, or integrated with the text of the XMPP message. It should be appreciated by one of ordinary skill in the art, that while the message is described herein as being implemented in XMPP, other implementations may further be possible.

In step 250, the message having the tag is sent to the target device determined in step 220. In one embodiment, the process provides simple, seamless communication between the devices, without the devices having to know specific details about one another. That is, in one or more embodiments, the implementation specifications of devices within the device network are only known by the central server 105. Thus the system provides a process of enabling communication between several devices with different functionalities, platform specifications, applications, implementation details, etc., while allowing the user of these devices to easily, and without any platform or implementation restrictions, communicate with one another.

Figure 3:
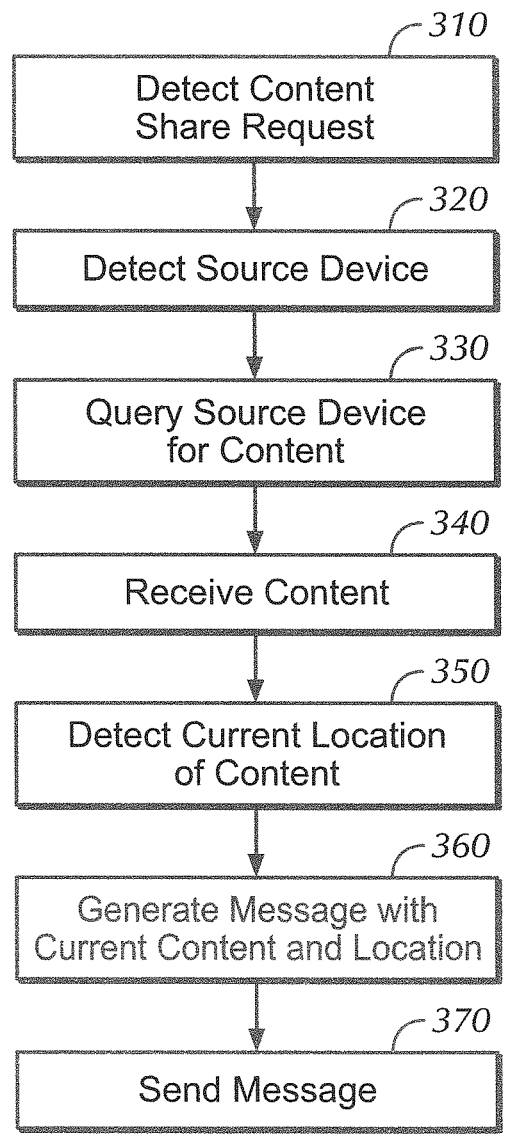
FIG. 3 is a flow diagram of a process for receiving a content share request, according to several embodiments of the present invention.

Next referring to FIG. 3, a flow diagram of a process for receiving a content share request is illustrated, according to several embodiments of the present invention.

First, in step 310, a content share request from the first device is received at the central server. In one embodiment, the first device will generate a message to the central server to communicate the request to the central server 105. In one embodiment, for example, as described above, a user at the first device will view one or more devices and will select one of the devices. The user may then request to share in a viewing experience with that second device referred to herein as the source device. In one embodiment, an XMPP message containing the request is sent to the central server.

In step 320 the process determines the source device associated with the share request from the first device. Furthermore, in step 320, the central server may determine the content requested from the source device.

Next, in step 330, the central server queries the source device for the specific content in, and receives the content in step 340. In one embodiment, the content is uploaded to the central server 105. In some embodiments, the content may be uploaded using HTTP upload of the content. In one embodiment, the content may comprise one or more of video, audio, images, or other multimedia content. In an alternative embodiment, the first device may directly communicate with the second source device and request the content. In such embodiment, the process begins at step 340 where the central server receives the content from the source device.

Next, in step 350, the central server determines the current location of content and/or another data necessary for synchronization of playback. For example, in one embodiment, the central server may send an XMPP message to the source device to determine the location within the content currently being played back at the source device. In another embodiment, such data may be provided to the central server automatically when the content is uploaded to the central server. Since the XMPP implementation enables persistent connection, the central server may periodically obtain such synchronization information.

In one embodiment, next, in step 360, the central server generates a message with the content and/or synchronization information regarding the content. In one embodiment, in step 360, the central server generates a URL of the content, and further generates synchronization data regarding the content. In one embodiment, the URL and/or the synchronization data is generated according to specific details regarding the playback application at the first device such that the player at the first device is able to receive the message and use the data within the message to play back the content.

Next, in step 370, the central server sends the message to the first device. In one embodiment, the central server may send both the URL and synchronization data in one XMPP message, while in another embodiment, separate XMPP messages may be generated for each of the URL and synchronization data. In one embodiment, where the central server periodically queries the source device for synchronization information, several XMPP messages may be sent to the first device, to provide ongoing synchronization of the content.

In one embodiment, upon receiving the XMPP message, the player at the first device begins streaming the content from the central server 105, e.g., through HTTP streaming. Further, in one embodiment, the player parses the synchronization data to begin playback of the data at the same location as the source device. In some embodiments, the user may not wish to enjoy a synchronized playback of content, in such embodiments, synchronization data may not be queried from the source device, sent to the second device, and/or employed at the first device and the content may be played back without any synchronization with the source device.

Furthermore, it should be noted that multimedia content such as audio files, voice messages, etc. may be sent from one device to another within the network without any request first being received from the first device. Instead, in such embodiments, the content is forwarded to the central server 105 from the source device and next forwarded to the target device. For example, as described above, in some embodiments the source device comprises voice functionality and may send a voice message to a target device. In one or more embodiments, similar steps are performed in forwarding content from the source device to the target device. For example, the same steps 340-360 may be performed to provide the content to the target device.

Figure 4:
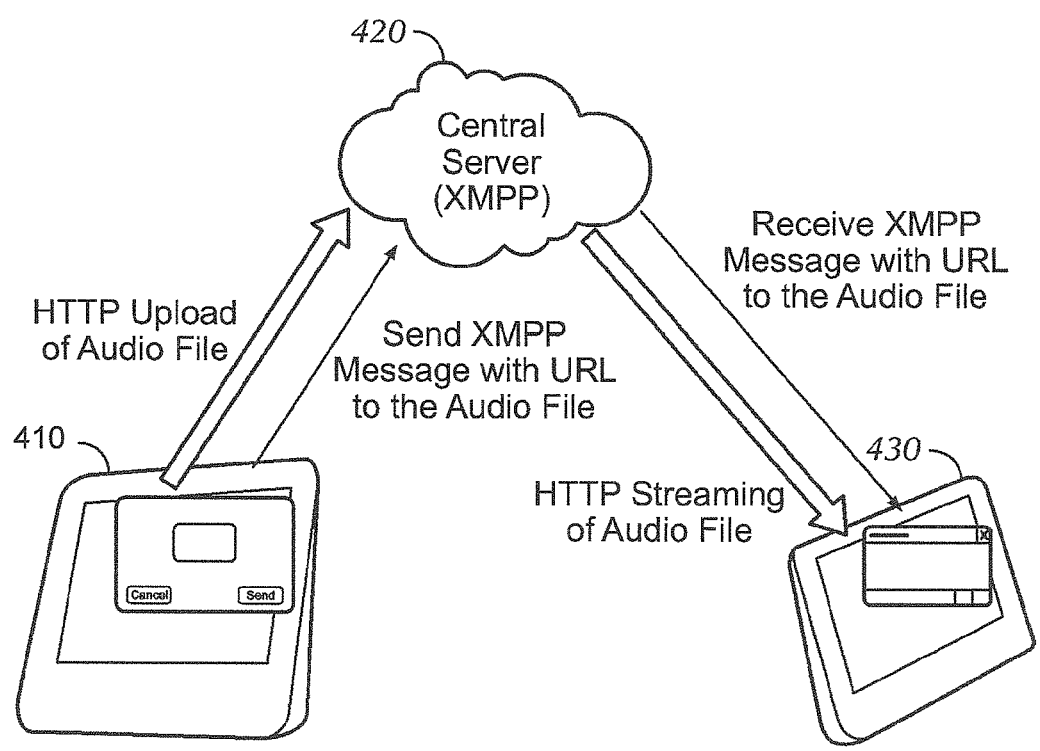
FIG. 4 is an exemplary diagram of a method for sending audio files from a source device to a target device, according to several embodiments of the present invention.

FIG. 4 illustrates an exemplary diagram of a method for sending audio files from the source device to the target device, according to one embodiment of the present invention. While, this exemplary figure illustrates an embodiment for transferring an audio file from one device to another within the network, it should be appreciated by one of ordinary skill in the art that any multi-media content stored at the first device may be transmitted to the second device according to a similar method.

As illustrated, the first device 410, uploads an audio file to the central server 420. In one embodiment the audio file is uploaded to the central server using an HTTP upload protocol. In a further embodiment, a URL to the audio file is further transmitted from the first device 410 to the central server 420. In one embodiment, the URL is embedded within an XMPP message. Next, the central server receives the audio file and forwards the XMPP message having embedded therein the URL to the audio file to the second device 430. Furthermore, in one or more embodiments, the central server 420 further streams the audio file to the second device 430. In one embodiment, the streaming is performed using the HTTP protocol. In some embodiments, the streaming may occur automatically, while in other embodiments, the streaming begins after the user receives the XMPP message with the URL and clicks on the URL. In some embodiments, using this method of transfer, varying factors regarding the different devices, such as protocol, platform, bandwidth, etc. may be accounted for without having to introduce additional applications at either device. In such embodiments, the central server acts as an intermediary and manages the data exchange between devices having different characteristics.

Figure 5:
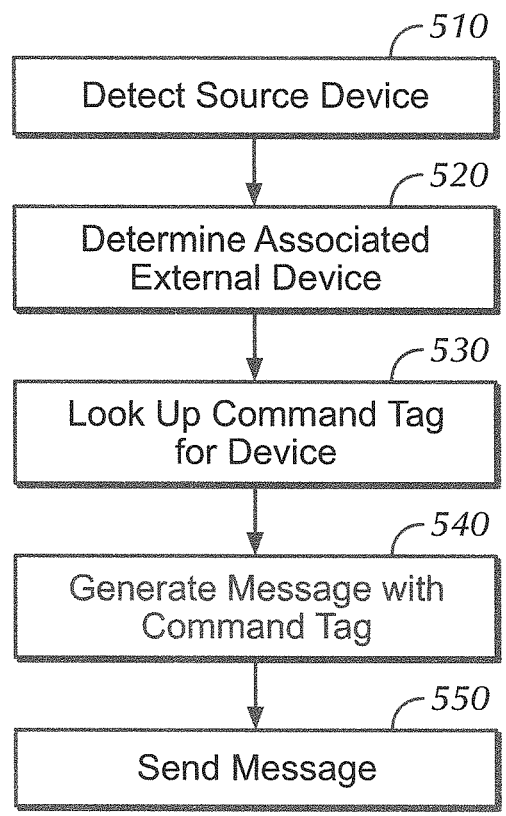
FIG. 5 is a flow diagram of a method for sending a control command from a first device to a second device, according to several embodiments of the present invention.

Next, referring to FIG. 5, a flow diagram of a method for sending a function command from a first device to a second device is illustrated, according to several embodiments of the present invention.

The process begins in step 510 where a command request is detected at the central server. In one embodiment, for example, as described above, a first device selects the second device and selects a function to be performed at the second device. In one embodiment, the first device sends a message to the central server, having embedded therein the command corresponding to the function to be performed at the second device. In one embodiment, the message is implemented in XMPP and the command is embedded within the message, e.g., within the text of the XMPP message. In some embodiments, upon receiving the message, in step 510 the central server detects that the message contains a command and therefore detects that a command must be performed at a second device.

Next, in step 520, the central server determines the device associated with the command. In one embodiment, the command received from the first device contains an identifier of the second device. In one embodiment, the identifier is embedded within the body of the message, e.g., embedded within the text of the message. Upon determining the identity of the second device, the process continues to step 530 and determines a command tag for the determined second device. As described above, in one or more embodiments, the first device is only presented with basic information about the second device and does not need to store specific data regarding the protocols, platforms, applications, and other implementation details at the second device. Instead, such information is stored at the central server which serves as an intermediary to facilitate communication between the devices.

In step 530, the central server parses the command request and determines the function associated with the command request. In one embodiment, the command may for example comprise a mute command. According to one embodiment, the central server is configured to lookup the specific function associated with the command and to determine the specific commands that must be performed at the second device to result in the specific function. In one embodiment, for example, the central server stores device specific look up tables or other mechanisms having stored therein associations between functions and command tags executable at the second device to cause the function to be performed. In one embodiment, the central server after determining the associated device, retrieves the specific look up table for the determined second device and retrieves the command tags for performing the function associated with the request detected in step 510.

In one embodiment, after looking up the command, in step 540, a message is generated having embedded therein one or more command tags for performing the specific functions. In one embodiment, the message comprises an XMPP message and one or more commands may be embedded within the text of the XMPP message. Upon generating the message, the message is forwarded to the second device in step 550.

Figure 6:
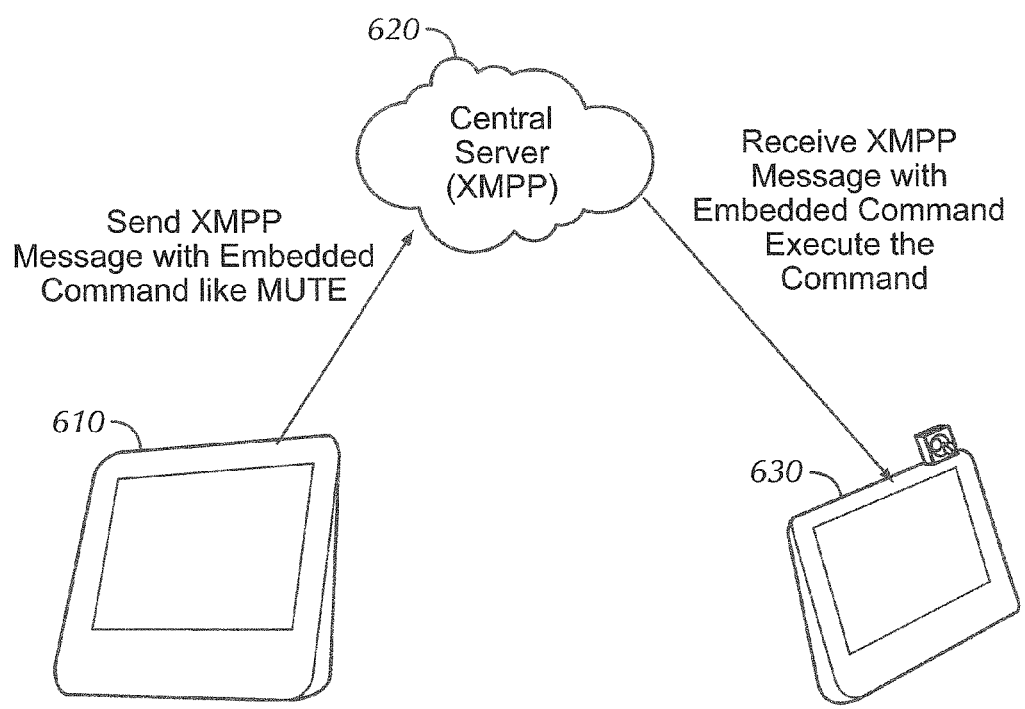
FIG. 6 is an exemplary diagram of the process of sending a command from a first device to the second device, according to several embodiments of the present invention.

FIG. 6 illustrates a diagram showing the process described above for sending a command from a first device to the second device. As illustrated, the first device 610 generates and sends an XMPP message with an embedded command to the central server 620. In one embodiment, the message, in addition to the embedded command, may further comprise an identification of the device at which the command must be performed. In another embodiment, the identification of the second device may be sent within a separate message. In yet another embodiment, the identification may be a part of the command embedded within the message.

The central server 620 receives the message and according to the steps described above generates a second XMPP message having embedded therein one or more command tags for performing the function associated with the command embedded within the message received from device 610. The central server then sends the message to device 630 where the command is executed. In one exemplary embodiment, the command embedded in the message received from device 610 may comprise a mute command. The process described above will cause the device 630 to be muted once the one or more command tags are executed at the device 630.

Figure 7:
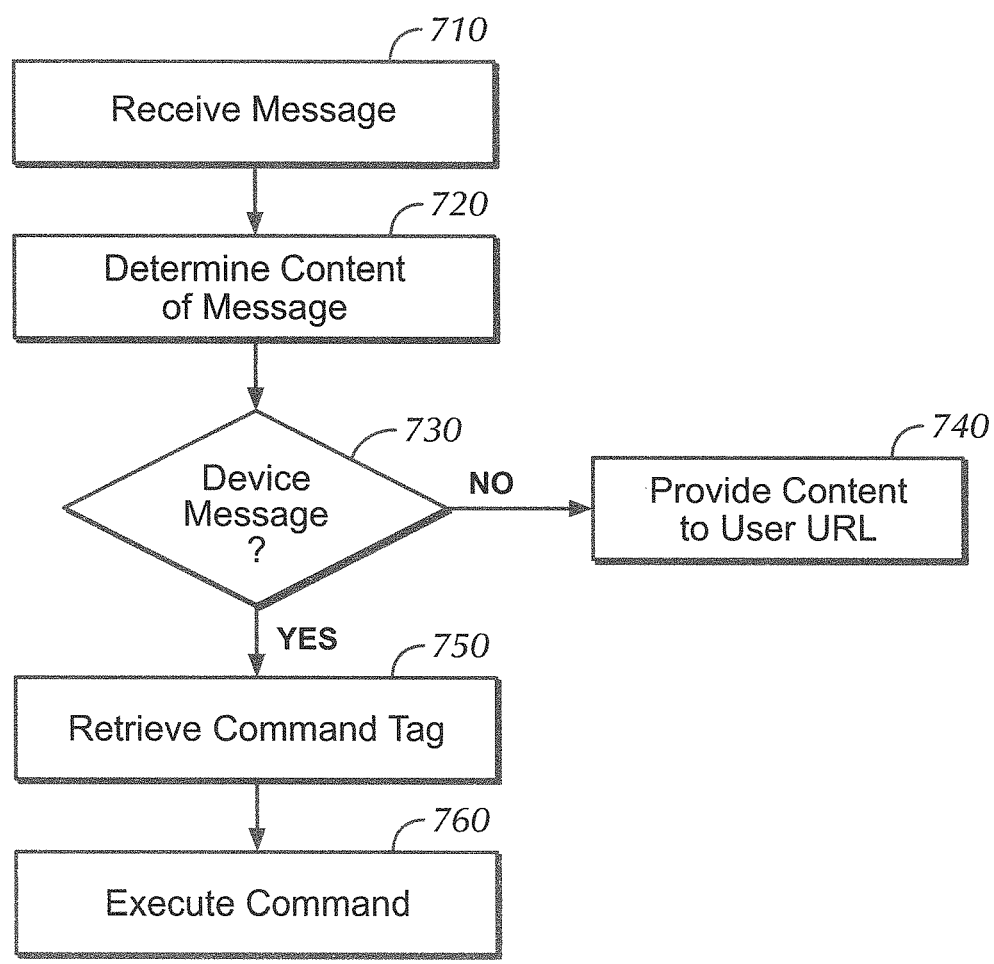
FIG. 7 is a flow diagram of a process performed at a device receiving a message from the central server and/or another device within the network, according to several embodiments of the present invention.

Next, referring to FIG. 7, a flow diagram is illustrated of a process performed at a device receiving a message from the central server and/or another device within the network.

First, in step 710, the device receives a message. For example, in one embodiment, the device receives an XMPP message through a persistent connection established with the central server and/or one or more devices within the network. Upon receiving the message, in step 720 the device parses the message to determine the content of the message. In one embodiment, the message contains text, URL to content, command tags, and/or attachments. In result of the parsing of the message and determining the content, the process continues to step 730 and the device determines the type of request or command included in the message. That is, the messages sent to the device may comprise a device message, a message including a device request or command, i.e., a message to cause the device to perform a specific function, or a user message, a message including a user request or user command, i.e., a message providing the user operating the device with one or more content, such as multimedia content, text, audio, etc.

If in step 730 it is determined that the command comprises a device message, the process continues to step 750. In step 750, the one or more command tags embedded within the message are retrieved and in step 760 the command tags are executed at the device to perform a specific function at the device.

On the other hand, if the message contains a user message, the process continues to step 740 and content within the message is provided to the user. For example in one embodiment, the message contains a URL to the content that is provided to the user in step 740. In one embodiment the content comprises audio, video, images, text, etc. that is displayed or played back at the device. In one embodiment, the user may receive the URL and select to view the content. In such embodiment, the content may begin streaming to the device, for example according to HTTP streaming protocol. By allowing streaming of the content, factors such as limited storage and bandwidth at the device may be addressed while allowing the user to experience content. In another embodiment, the message may include the content as an attachment and the entire content may be received and stored at the device.

In one embodiment, the client application is implemented through at least two modules. The first module implements the user interface, and takes advantage of the platform specific functionalities and tools of the device. For example, according to one embodiment, the first module may be implemented in Flash so that it takes full advantage of Flash development style and tool, and maximizes user experience.

Figure 8:
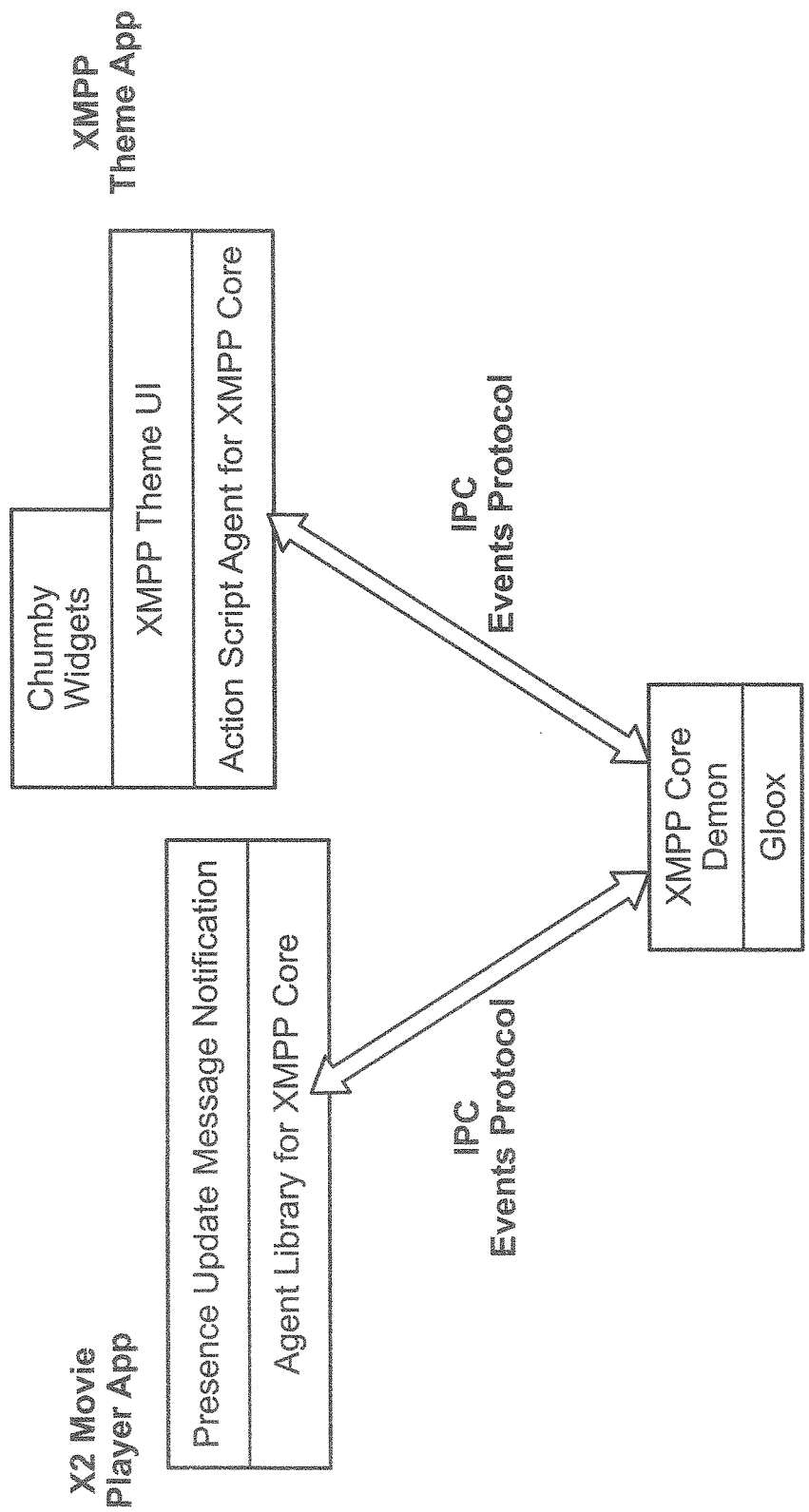
FIG. 8 is a diagram of exemplary block diagram of the client application at one or more devices, according to several embodiments of the present invention.

In some embodiments, the second module is the functional core of the client. The core module, interchangeably referred to herein as xmppcored, may be implemented such that it can be used on any platform, such as DTV, BDP, etc. Thus, in one or more embodiments, the core module is platform independent. The core module, xmppcored, is further implemented such that it may connect multiple applications by socket. For example, in one embodiment as illustrated in FIG. 8, Flash module and a secondary application called X2 application are connected to xmppcored. Thus, according to one or more embodiments, the present system provides functionalities such that they may be used on a different platform and can support multiple applications. The xmppcored and Flash App modules are referred to throughout this embodiment as exemplary embodiments. It should be understood by one skilled in the art that the general principles of these modules apply broadly to any modules capable of performing similar functions as is described with respect to these modules.

Figure 10:
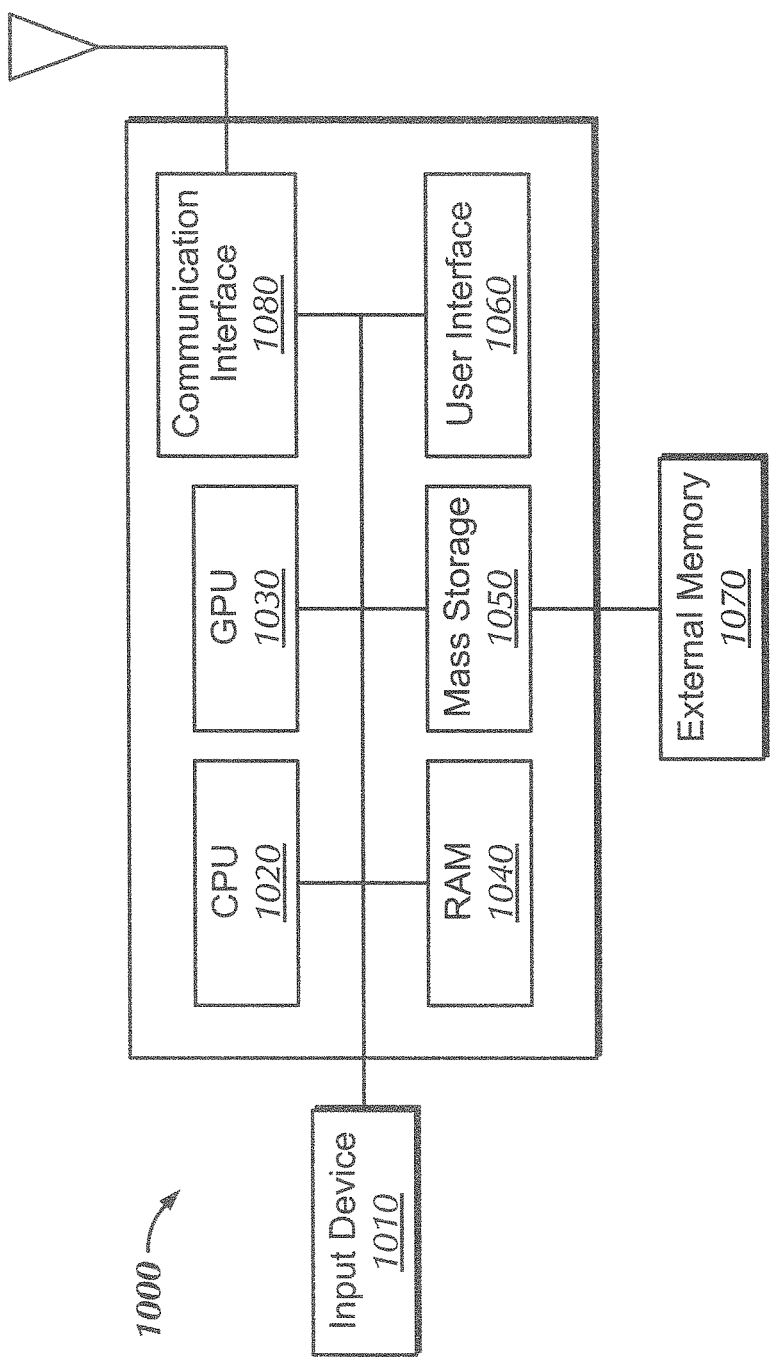
FIG. 10 is a block diagram illustrating a processor-based system that may be used to run, implement and/or execute the methods and/or techniques shown and described herein in accordance with embodiments of the present invention.

The methods and techniques described herein may be utilized, implemented and/or run on many different types of systems. Referring to FIG. 10, there is illustrated a system 1000 that may be used for any such implementation. One or more components of the system 1000 may be used for implementing any system or device mentioned above, such as for example any of the above-mentioned devices, applications, servers, databases, etc. However, the use of the system 1000 or any portion thereof is certainly not required.

By way of example, the system 1000 may comprise a User Input Device 1010, a Central Processing Unit (CPU) 1020, a Graphic Processing Unit (GPU) 1030, a Random Access Memory (RAM) 1040, a mass storage 1050, such as a disk drive, a user interface 1060 such as a display, External Memory 1070, and Communication Interface 1080. The CPU 1020 and/or GPU 1030 may be used to execute or assist in executing the steps of the methods and techniques described herein, and various program content, images, games, simulations, representations, communities, interfaces, etc. may be rendered on the user interface 1060. The system 1000 may further comprise a user input device 1010. The user input device may comprise any user input device such a keyboard, mouse, touch pad, game controller, etc. Furthermore, the system 1000 may comprise a communication interface 1080 such as a communication port for establishing a communication with one or more other processor-based systems and receiving one or more content. In one embodiment, the communication interface 1080 may further comprise a transmitter for transmitting content, messages, or other types of data to one or more systems such as external devices, applications and/or servers. The system 1000 comprises an example of a processor-based system.

The mass storage unit 1050 may include or comprise any type of computer readable storage or recording medium or media. The computer readable storage or recording medium or media may be fixed in the mass storage unit 1050, or the mass storage unit 1050 may optionally include external memory and/or removable storage media 1070, such as a digital video disk (DVD), Blu-ray disc, compact disk (CD), USB storage device, floppy disk, or other media. By way of example, the mass storage unit 1050 may comprise a disk drive, a hard disk drive, flash memory device, USB storage device, Blu-ray disc drive, DVD drive, CD drive, floppy disk drive, etc. The mass storage unit 1050 or external memory/removable storage media 1070 may be used for storing code that implements the methods and techniques described herein.

Thus, external memory and/or removable storage media 1070 may optionally be used with the mass storage unit 1050, which may be used for storing code that implements the methods and techniques described herein, such as code for generating and storing the tag data described above, performing the initiation of a session, evaluating, and matching of the users. However, any of the storage devices, such as the RAM 1040 or mass storage unit 1050, may be used for storing such code. For example, any of such storage devices may serve as a tangible computer storage medium for embodying a computer program for causing a console, system, computer, or other processor based system to execute or perform the steps of any of the methods, code, and/or techniques described herein. Furthermore, any of the storage devices, such as the RAM 1040, mass storage unit 1050 and/or external memory 1070, may be used for storing any needed database(s), tables, content, etc.

In some embodiments, one or more of the embodiments, methods, approaches, and/or techniques described above may be implemented in a computer program executable by a processor-based system. By way of example, such processor based system may comprise the processor based system 1000, or a computer, entertainment system, game console, graphics workstation, etc. Such computer program may be used for executing various steps and/or features of the above-described methods and/or techniques. That is, the computer program may be adapted to cause or configure a processor-based system to execute and achieve the functions described above.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides a computer-readable storage medium storing a computer program for use with a computer simulation, the computer program adapted to cause a processor based system to execute steps comprising: detecting a request at a processor-based device to perform a function, determining an external device corresponding to the request, retrieving a tag for the external device for performing a function corresponding to the request and generating a message implemented in XMPP, having embedded therein the tag, wherein the tag is essential at the external device for performing the function corresponding to the request.

In another embodiment, the present invention provides a computer program product comprising a medium for embodying a computer program for input to a computer and a computer program embodied in the medium for causing the computer to perform or execute steps comprising receiving a message, determining whether the message comprises a device message, retrieving a tag included in the message, wherein the tag corresponds to an executable command to perform a function when it is determined that the message comprises a device message and executing the tag to perform the function.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

While the invention herein disclosed has been described by means of specific embodiments, examples and applications thereof, numerous modifications and variations could be made thereto by those skilled in the art without departing from the scope of the invention set forth in the claims.

What is claimed is:

1. A method comprising:
receiving a presence message at a processor-based device from one or more external devices, the presence message comprises information on one or more of a current content being played at the one or more external devices;

providing the information on current content being played to others of the one or more external devices for display;
detecting a request for the current content being played, at the processor-based device, to perform a function;
determining an external device corresponding to a device selection made in the request;
retrieving a tag for the external device for performing the function corresponding to the request, the tag comprising a link to the current content being played and a synchronization tag; and
generating a message implemented in a presence and messaging protocol, having embedded therein the tag, wherein the tag is essential at the external device for performing the function corresponding to the request;
wherein the external device is remote from the processor-based device.

2. The method of claim 1, further comprising sending the message to the external device for performing the function.

3. The method of claim 1, wherein the request comprises a user command for performing the function at the external device and wherein the tag comprises a command tag executable by the external device to perform the function.

4. The method of claim 1, wherein the request comprises a share content request from a user of the external device and wherein the synchronization tag comprises a synchronization time stamp specifying a current location of content for synchronized playback.

5. The method of claim 4, further comprising:
detecting a source device for the share content request;
determining a content currently playing at the source device; and
determining a current location within the content currently being played back at the source device.

6. The method of claim 1, wherein the presence message comprises a current status of the one or more devices.

7. The method of claim 6, wherein the current status further comprises current location of content being played at the one or more devices, operational status of the one or more devices, and a user operating the one or more devices.

8. A device comprising:
a processor configured to perform steps comprising:
receiving a presence message at a processor-based device from one or more external devices, the presence message comprises information on one or more of a current content being played at the one or more external devices;
providing the information on the current content being played to others of the one or more external devices for display;
detecting a request for the current content being played, at the processor-based device, to perform a function;
determining an external device corresponding a device selection made in to the request;
retrieving a tag for the external device for performing the function corresponding to the request, the tag comprising a link to the current content being played and a synchronization tag; and
generating a message implemented in a presence and messaging protocol, having embedded therein the tag, wherein the tag is essential at the external device for performing the function corresponding to the request;
wherein the external device is remote from the processor-based device; and
wherein the processor-based device directly communicates with the external device.

9. The device of claim 8, wherein the processor is further configured to send the message to the external device for performing the function.

10. The device of claim 9, further comprising a communication interface for establishing a connection to one or more devices comprising the external device, wherein sending the message comprises sending the message over the connection.

11. The device of claim 10, wherein the processor is further configured to receive the presence message from the one or more devices over the connection, wherein the presence message comprises a current status of the one or more devices.

12. The device of claim 11, further comprising a display configured to display the presence message for each of the one or more devices.

13. The device of claim 8, wherein the request comprises a user command for performing the function at the external device and wherein the tag comprises a command tag executable by the external device to perform the function.

14. The device of claim 8, wherein the request comprises a share content request from a user of the external device and wherein the synchronization tag comprises a synchronization time stamp specifying a current location of content for synchronized playback.

15. The device of claim 14, wherein the processor is further configured to perform the steps comprising:
detecting a source device for the share content request;
determining a content currently playing at the source device; and
determining a current location within the content currently being played back at the source device.

16. A tangible non-transitory computer readable medium storing one or more computer readable programs adapted to cause a processor based system to execute steps comprising:
receiving a presence message at a processor-based device from one or more external devices, the presence message comprises information on one or more of a current content being played at the one or more external devices;
providing the information on the current content being played to others of the more or more external devices for display;
detecting a request for the current content being played, at the processor-based device, to perform a function;
determining an external device corresponding to a device selection made in the request;
retrieving a tag for the external device for performing the function corresponding to the request, the tag comprising a link to the current content being played and a synchronization tag; and
generating a message implemented in a presence and messaging protocol, having embedded therein the tag, wherein the tag is essential at the external device for performing the function corresponding to the request;
wherein the external device is remote from the processor-based device; and
wherein the processor-based device directly communicates with the external device.

17. A method comprising:
receiving a presence message comprising information on one or more of a current content being played at one or more external devices;
displaying the information on the current content being played at the one or more external devices;
receiving a message implemented in a presence and messaging protocol from an remote processor-based device;
determining whether the message comprises a device message;
retrieving a tag included in the message, wherein the tag corresponds to an executable command to perform a function when it is determined that the message comprises the device message, the tag comprising a link to the current content being played and a synchronization tag; and executing the tag to perform the function using the link and the synchronization tag.

18. The method of claim 17, further comprising:

retrieving a content associated with the message when it is determined that the message does not comprise the device message; and providing the content to a user.

19. The method of claim 18, wherein the content is appended to the message and received along with the message.

20. The method of claim 18, wherein the content comprises a voice message.

21. The method of claim 18, wherein the content comprises multi-media content.

22. The method of claim 18, wherein the synchronization tag comprising a current location and wherein providing the content to the user comprises beginning playback of the content at the current location specified by the synchronization tag.

23. A device comprising:

a processor configured to perform steps comprising:

receiving a presence message comprising information on one or more of a current content being played at one or more external devices;

displaying the information on the current content being played at the one or more external devices;

receiving a message implemented in a presence and messaging protocol from a remote processor-based device;

determining whether the message comprises a device message;

retrieving a tag included in the message, wherein the tag corresponds to an executable command to perform a function when it is determined that the message comprises the device message, the tag comprising a link to the current content being played and a synchronization tag; and executing the tag to perform the function using the link and the synchronization tag.

24. The device of claim 23, further comprising a communication interface for establishing a connection, wherein receiving the message comprises receiving the message over the connection.

25. The device of claim 23, wherein the processor is further configured to send a presence message implemented in the presence and messaging protocol, wherein the message comprises one or more of a current content being played at the device, current location of content being played at the device, operational status of the device, and user operating the device.

* * * * *